United States Patent [19]

Biermann et al.

[11] Patent Number: 4,491,619
[45] Date of Patent: Jan. 1, 1985

[54] THERMOSTABLE IRON OXIDE PIGMENTS

[75] Inventors: Hans-Peter Biermann; Peter Köhler; Heinrich Heine, all of Krefeld, Fed. Rep. of Germany

[73] Assignee: Bayer Aktiengesellschaft, Leverkusen, Fed. Rep. of Germany

[21] Appl. No.: 475,708

[22] Filed: Mar. 16, 1983

[30] Foreign Application Priority Data

Mar. 27, 1982 [DE] Fed. Rep. of Germany ....... 3211327

[51] Int. Cl.³ .............................................. B32B 5/16
[52] U.S. Cl. .................................. 428/403; 106/304; 106/308 B; 428/900
[58] Field of Search ................ 428/403, 900; 106/304, 106/308 B

[56] References Cited

U.S. PATENT DOCUMENTS

| 2,357,721 | 9/1944 | Allan | 106/308 B |
| 3,991,240 | 11/1976 | Harrington et al. | 428/403 X |
| 4,145,229 | 3/1979 | Ferrero et al. | 106/304 |
| 4,175,158 | 11/1979 | Saunders | 428/403 X |
| 4,321,301 | 3/1982 | Brichard et al. | 428/403 |

OTHER PUBLICATIONS

4029 World Surface Coating Abstracts, vol. 54, Jan. 1981, No. 463, Old Woking, Surrey, Gr. Britain, Abstract No. 81/0017.

Primary Examiner—Thomas J. Herbert
Attorney, Agent, or Firm—Connolly and Hutz

[57] ABSTRACT

Iron oxide particles containing at least 5% by weight of iron (II) content calculated as FeO are stabilized against atmospheric oxidation by a coating of at least one compound containing boron and those particles are useful as coloring pigments and magnetic particles in magnetic recording media.

9 Claims, 2 Drawing Figures

THERMOSTABLE IRON OXIDE PIGMENTS

FIELD OF THE INVENTION

This invention relates to iron oxide pigments having an iron(II)content of at least 5%, by weight, and having a boron containing coating to increase the stability against atmospheric oxidation, to processes for the production thereof and to the use thereof.

BACKGROUND

Iron oxide pigments which contain iron in the +2 oxidation state are thermodynamically unstable compared to iron(III)oxide ($Fe_2O_3$). They may be partially or completely oxidised in the presence of air or oxygen, for example:

$$2Fe_3O_4 + \tfrac{1}{2}O_2 \rightarrow 3Fe_2O_3 \qquad (1).$$

Reactions of this type are known, for example in the case of black iron oxide pigments which correspond in composition and structure to magnetite. As a result of oxidation, the pigment loses its most important property, namely its color, and is thus unuseable. The tendency towards oxidation understandably increases with increasingly fine particle size of the pigments and thus increasing specific surface area thereof.

The same also applies to mixtures of black iron oxide with other iron oxide coloring pigments, e.g. red iron oxide or yellow iron oxide, as they are produced for shades of brown.

If, in the case of coloring pigments, it is the loss of the color properties which renders them unuseable, then, in the case of magnetic pigments containing iron(II), it is the loss of the magnetic properties, which is also caused by oxidation. Above all, finely-divided magnetite pigments and mixed phases between magnetite ($Fe_3O_4$) and maghemite ($\gamma$-$Fe_2O_3$) having a high iron(II) content are at risk. However, the following are also sensitive to oxidation: mixed phases of magnetite with maghemite and/or ferrites, for example cobalt ferrite, and those magnetic pigments which are composed of a core of $Fe_3O_4$ or an iron oxide having an oxidation state between $Fe_3O_4$ and $\gamma$-$Fe_2O_3$, and a coating surrounding this core consisting of magnetic metal oxides, in particular of iron and cobalt. In addition to the term "mixed phase", the technical literature also provides the expression "berthollides" for the above described compositions.

Attempts have been made to reduce the oxidation sensitivity of finely-divided ferrimagnetic magnetite pigments by a treatment with heterocyclic organic compounds (German Offenlegungsschrift No. 2,744,598). Compared to untreated pigments, the treatment has provided a considerable improvement which, however, proved impossible to increase above a certain level. Moreover, the heterocycles used are only physically adsorbed on the pigment and thus pass into the water-soluble constituents to a considerable extent. Consequently, incompatibilities in different binder systems may result.

German Offenlegungsschrift No. 2,743,298 discloses metal particles which consist essentially of iron and contain boron on the surface in the form of borate. European Patent No. 3100 describes a ferrimagnetic iron oxide which may also contain boron in addition to other elements for protection against sintering during conversion processes.

However, no suggestion of thermostabilisation of iron oxide pigments containing iron(II) may be inferred from these references.

SUMMARY OF THE INVENTION

Thus, an object of the present invention is to provide a method of improving the thermal stability of iron oxide pigments containing iron(II) in the presence of oxygen, air or other free oxygen containing gases. In such a method, the pigments should contain fewer water-soluble constituents and should not have the other disadvantages of the prior art pigments.

Surprisingly, it has now been found that pigments which have a coating of boron compounds meet these requirements in an outstanding manner. The present invention provides iron oxide pigments having an iron(II) content of at least 5%, by weight, calculated as FeO, and having a coating of at least one compound containing boron to increase the stability thereof to atmospheric oxidation.

The coating preferably consists of from 0.1 to 4%, by weight, of boron, calculated as $B_2O_3$, in the form of boron-oxygen compounds.

The present pigments are more resistant to oxidation than the prior art pigments, while they do not have the disadvantages thereof.

The following test is used to determine thermostability:

A sample of the pigment to be tested is compressed into a powder tablet of about 4 cm in diameter under a pressure of about 20 bars for 20 seconds. The thus obtained pressed tablet is exposed to air for 1 hour at a pre-selected constant temperature. At the thus-tempered sample the part of the light colored red is determined on one front face using a filter spectral photometer (ELREPHO) in remission with the $R_x$ filter. The difference between the $R_x$ values of a tempered and an untempered sample ($\Delta R_x$) is a measurement of the proportion of iron(III)oxide ($Fe_2O_3$) which has formed during the tempering treatment by oxidation. The temperature at which a sample has been tempered the $\Delta R_x$ value of which is 1.0 compared to the untempered sample, is defined as a measurement number for the thermostability of the pigment (stability limit temperature).

Figure 1:
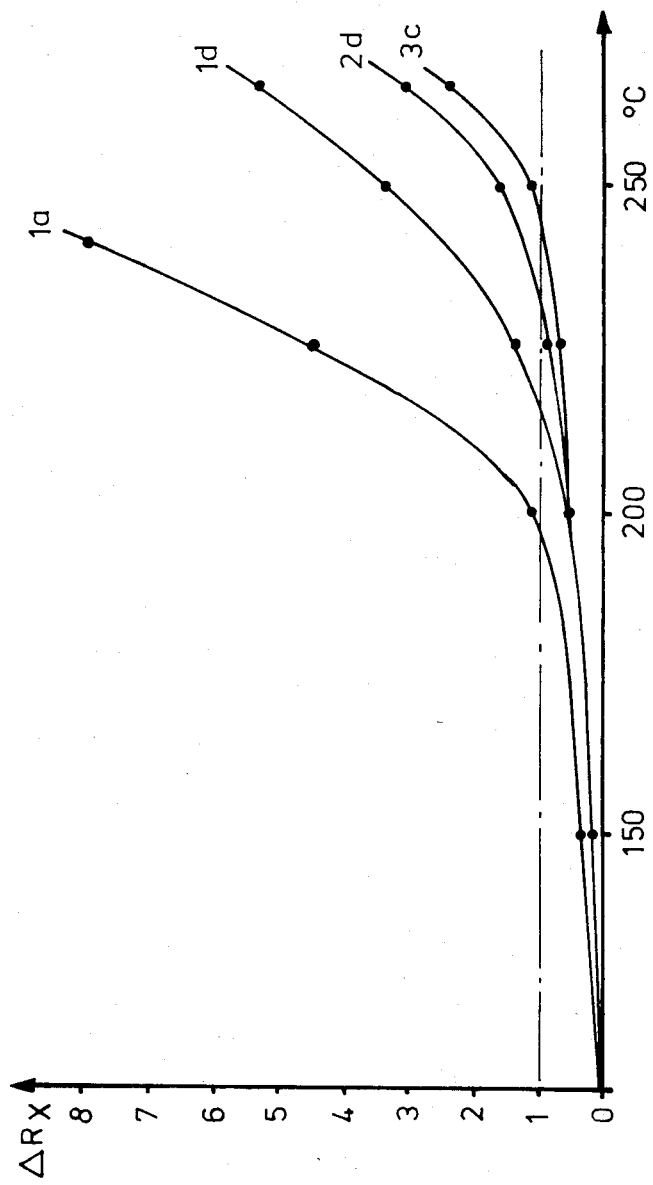
FIG. 1 is a graph which illustrates the relative thermostability of products from Examples 1a, 1d, 2d and ec.
Figure 2:
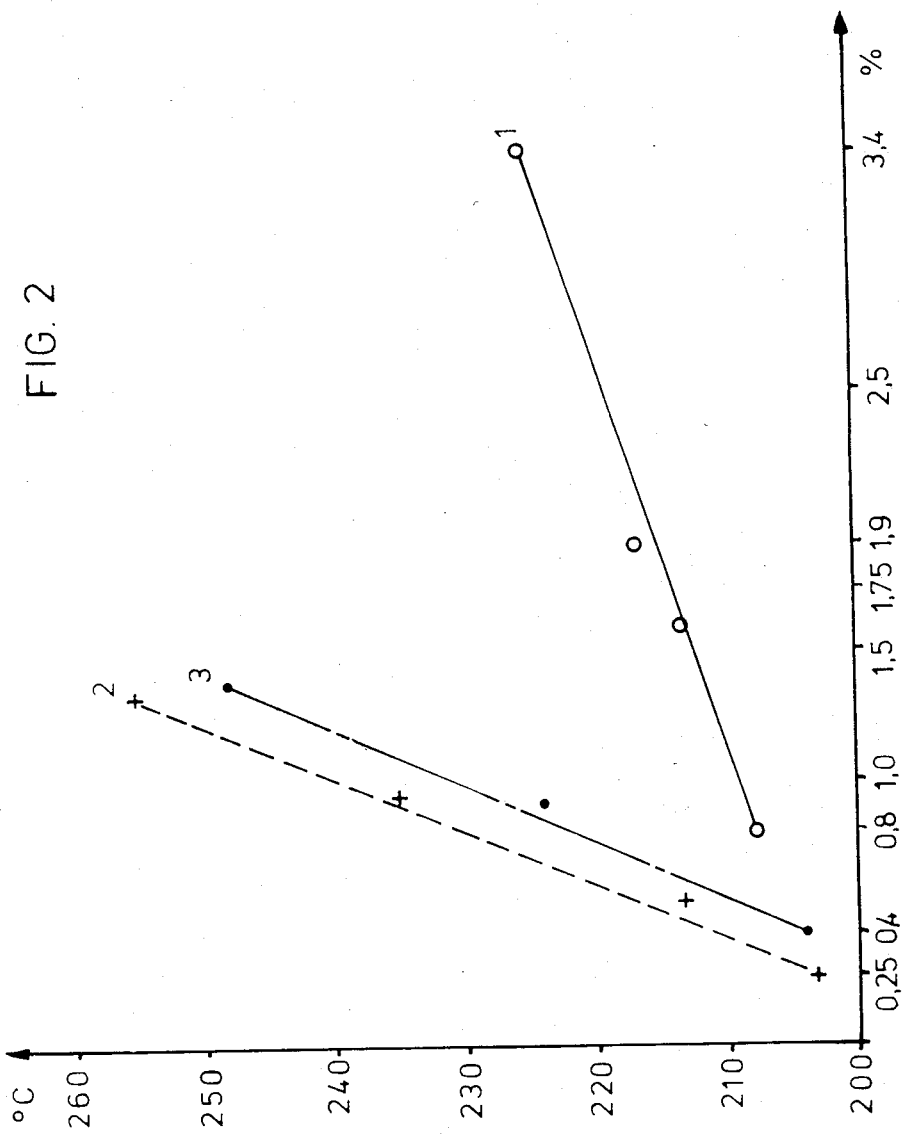
FIG. 2 is a graph which illustrates the effect on the stability limit temperature ($\Delta R = 1$) of various levels of coating material for Example 1, 2 and 3.

The iron oxide pigments containing iron(II) to be stabilised may be coloring pigments, such as black iron oxide and brown iron oxide, but they may also be magnetic pigments, such as megnetite or mixed phases of magnetite with maghemite (berthollide iron oxides) and/or ferrites or magnetites, resp. iron oxides having an oxidation state between magnetite and maghemite, coated with magnetic metal oxides.

The production of such pigments is described in the literature and may be achieved by many processes. On a commercial scale, black iron oxide pigments are generally produced by one of two processes (Ullmanns Encyklopädie der technischen Chemie, 4th edition, volume 18, p. 603, Verlag Chemie GmbH, Weinheim 1979), i.e. the precipitation process, wherein iron(II) salt solutions are precipitated using alkalis in the vicinity of the neutral point, with the introduction of air at about 90° C., until an Fe(III)/Fe(II) ratio of about 2 is reached, and the aniline process, wherein nitrobenzene is reduced to aniline using metallic iron and which may be controlled such that intensively colored black iron oxide pigments are produced.

Usually up to 5%, by weight, of secondary constituents, for example $SiO_2$ or $Al_2O_3$ are present, depending on the production process and on the purity of the raw materials used. The Fe(III)/Fe(II) ratio in the commercial products is usually also greater than 2, differing from the theoretical value, and is usually from 2.3 to 3.0. Brown iron oxide pigments containing iron (II) are generally produced by mixing yellow iron oxide and/or red iron oxide with black iron oxide (Ullmanns Encyklopädie der technischen Chemie, loc cit). The starting materials for the production of iron oxide magnetic pigments containing iron (II) (Ullmanns Encyklopädie der technischen Chemie, 4th edition, volume 18, P 643, Verlag Chemie GmbH, Weinheim 1979) are for the most part $\alpha$-FeOOH or $\gamma$-FeOOH, which are dried, dehydrated and reduced using hydrogen at temperatures from 350° to 600° C. to produce $Fe_3O_4$. Mixed phases of magnetite and maghemite (berthollides) may be obtained by the partial oxidation of the magnetite pigments under mild conditions. Mixed phase pigments (berthollides) of magnetite with maghemite and/or ferrites are usually produced by simultaneously precipitating ferrite-forming metals, for example Zn, Mn, Co, Ni, Ca, Mg, Ba, Cu or Cd, as oxides or hydroxides during the production of FEOOH or applying them to finished FEOOH pigments, and converting them. Those special magnetic pigments which are produced by applying a coating of magnetic metal oxides, in particular of iron and cobalt, to a core of $Fe_3O_4$ or an iron oxide having an oxidation state between $Fe_3O_4$ and $\gamma$-$Fe_2O_3$ (for example epitaxial coating, German Auslegeschrift No. 2,235,383, German Offenlegungsschrift No. 2,817,410) may also be protected. The present processes are not impaired by the known measures against sintering and by after-treatments and dopings conventional in the production of magnetic pigments.

The present invention also provides processes for the production of the present iron oxide pigments. Thus, iron oxide pigments containing iron(II) produced in a known manner may be mixed with at least one boron compound, the resulting mixture may optionally be ground and may then optionally be tempered. It is also possible for iron oxide pigments which contain iron (II) produced in a known manner to be treated in suspension with at least one boron compound, to be dried, optionally ground and then optionally tempered.

The iron oxide pigments to be stabilized are mixed or treated with those boron compounds which are either boron-oxygen compounds or are capable of forming such compounds under the conditions applied. Examples of the suitable boron-oxygen compounds are ortho-boric acid, tetra-boric acid, meta-boric acid, vitreous diboron trioxide, crystalline diboron trioxide, boric acid trimethyl ester, boric acid triethyl ester, complexes of boric acids with polyhydroxy compounds and salts of boric acids, for example $NH_4B_5O_8 \cdot 4H_2O$, $Na_2B_4O_6 \cdot 10H_2O$, $CaB_3O_5OH \cdot 2H_2O$ or $NaBO_2$. Examples of compounds capable of forming boron-oxygen compounds under the conditions applied are, inter alia, boron/nitrogen compounds, such as tris (dimethylamino) borane or borazine or boron-sulphur compounds, such as diboron trisulphide or thioboric acid ester. Boron oxides, boric acids and/or salts of boric acids are preferably used as boron compounds, and ortho-boric acid and/or diboron trioxide are particularly preferred.

The quantity of boron compound and/or boron compounds to be added depends on the type of iron oxide pigments.

In the case of conventional black iron oxide pigments containing from 20 to 28% by weight, of iron(II) calculated as FeO, and having specific surface areas of from 12 to 18 $m^2/g$, measured using the nitrogen adsorption method according to BET, it is usually sufficient to add boron compound(s) in such amounts that the boron content in the treated pigment is 0.5 to 2%, by weight, calculated as $B_2O_3$. The pigments used for magnetic signal storage are more finely divided than black iron oxide pigments (BET surface areas greater than 18 $m^2/g$) and with the same iron(II) contents they require the addition of greater quantities of boron compound(s), corresponding to the specific surface area thereof which may easily exceed 40 $m^2/g$. If the iron(II) content is lower, as may be the case, for example for the above-described iron oxide magnetic pigments coated with magnetic metal oxides, then the quantity to be used may be reduced accordingly. Moreover, the quantity of boron compound(s) required to achieve the desired thermostability in each case may be established by simple tests by those skilled in the art.

According to one embodiment of the present invention, the iron oxide pigments containing iron(II) produced in a known manner are mixed with one or more boron compounds. Solid boron compounds are preferably finely divided before use. However, they may also be admixed in the form of a solution or suspension in an aqueous and/or organic medium. Conventional technical apparatus may be used for mixing, for example pneumatically operating mixers, paddle mixers, screw mixers, drum mixers or cone mixers. Mixing may be carried out at room temperature or above. The process is generally carried out in the presence of air, but the use of inert gases, for example nitrogen, is particularly preferred when an elevated temperature is used. If only small quantities of the boron compounds are mixed with large quantities of pigment, pre-mixing may be advantageous. The resulting mixture is then optionally ground. Grinding units of the most varied design are suitable for this purpose, for example cylinder mills, edge mills, pendulum mills, hammer mills, pinned disc mills, turbo mills, ball mills or jet mills. The mixture may be ground at room temperature or above, optionally under an inert gas, for example nitrogen. Finally, the ground material may optionally be tempered at a temperature of up to 500° C. under inert atmosphere or under an atmosphere containing only a small proportion of oxygen.

According to another embodiment of the present invention, the iron oxide pigments containing iron(II) produced in a known manner are initially treated in suspension with one or more boron compounds. Water is generally used as the suspending medium, but it is also possible in principle to use aqueous/organic or purely organic media. The boron compounds may be added at any time before, during or after the production of the pigment suspension. The treatment may be carried out at roon temperature or above, optionally under an inert atmosphere, and it preferably lasts for from 1 minute to a few hours. The treated pigment is dried in the second step of the process. It has proved to be advantageous to carry out the drying operation such that all of the liquid of the suspension is evaporated. The spray drying technique has proved to be particularly effective for this purpose. The treated, dried pigment is optionally ground as in the first process, and then optionally tempered at a temperature of up to 500° C. under an inert atmosphere or under an atmosphere containing only a small proportion of oxygen.

For reasons of cost, thermally-stable iron oxide pigments which contain iron(II) and are mixtures of different iron oxide coloring pigments are appropriately produced, such that only those mixture components which contain divalent iron are protected against oxidation according to the present invention and are thereafter mixed with the other iron oxide pigments. However, it is naturally also possible to subject the mixture of iron oxide coloring pigments containing iron(II) with iron oxide coloring pigments free from iron(II) to the present invention.

The thermally-stable iron oxide coloring pigments or pigment mixtures according to the present invention are used in areas where inorganic and/or organic materials are to be dyed. Thus, inter alia, they are used for dyeing purposes in the production of plastics parts, lacquers and dispersion dyes. They are preferably used for dyeing inorganic building materials, for example plasters, concrete tiles or lime sand bricks. The present thermally-stable iron oxide magnetic pigments may be used for the production of various types of magnetic recording media, for example audio and video tapes, instrumentation tapes, computer tapes, magnetic cards, flexible magnetic discs, rigid magnetic plates and drum stores.

The present invention will now be illustrated by the following Examples. The specific surface area were determined by the BET nitrogen adsorption method and the water-soluble proportions were determined according to DIN 53 197A.

EXAMPLE 1

7.5 kg of a black iron oxide coloring pigment (aniline process) were further processed as follows after drying:

(a) 1.5 kg of the pigment charge were ground for 10 minutes in a hammer mill and a specific surface area of 14.8 m$^2$/g and an FeO content of 24.5%, by weight, were determined. The nitrogen content was 0.15%, by weight. The water-soluble proportions amounted to 0.55%, by weight.

The thermal stability was tested according to the above described test, and a stability limit temperature of the untreated pigment of 198° C. ($\Delta R_x = 1$) was achieved.

(b) A further 1.5 kg of this pigment charge were mixed for 1 hour at about 30° C. in an intensive mixer (produced by Eirich) with the addition of 1%, by weight, of 3-amino-1,2,4-triazole and were ground, as in (a). A specific surface area of 14.1 m$^2$/g was determined. The analytically-determined content of 3-amino-1,2,4-triazole was 0.8%, by weight. The water-soluble proportions amounted to 1%, by weight.

The stability limit temperature of the pigment rose to 208° C. ($\Delta R_x = 1$).

(c) A further 1.5 kg of this charge were mixed for 1 hour at about 30° C. in an intensive mixer (produced by Eirich) with the addition of 1.75%, by weight, of 3-amino-1,2,4-triazole and were ground as in (a). A specific surface area of 13.5 m$^2$/g was determined. The analytically-determined content of 3-amino-1,2,4-triazole was 1.55%, by weight. The water-soluble proportions amounted to 1.4%, by weight.

The stability limit temperature of the pigment rose to 213° C. ($\Delta R_x = 1$).

(d) A further 1.5 kg of this pigment charge were mixed with 2.5%, by weight, of 3-amino-1,2,4-triazole and ground as in (a). A specific surface area of 13.4 m$^2$/g was determined. The analytically-determined content of 3-amino-1,2,4-triazole was 1.9%, by weight. The water-soluble proportions amounted to 1.7%, by weight.

The stability limit temperature of the pigment rose to 217° C. ($\Delta R_x = 1$).

(e) The last 1.5 kg of this charge were mixed with 4%, by weight, of 3-amino-1,2,4-triazole and ground as in (a). A specific surface area of 12.6 m$^2$/g was determined. The analytically-determined content of 3-amino-1,2,4-triazole was 3.4%, by weight. The water-soluble proportions amounted to 2.8%, by weight. The stability limit of the pigment rose to 225° C. ($\Delta R_x = 1$).

EXAMPLE 2

7.5 kg of a black iron oxide coloring pigment produced according to the aniline process (starting charge as for Example 1) were further processed as follows after drying:

(a) 1.5 kg of the pigment charge were ground for 10 minutes in a hammer mill and a specific surface area of 14.7 m$^2$/g and an FeO content of 24%, by weight, were determined. The content of boron, calculated as B$_2$O$_3$, was less than 0.1%, by weight, and the water-soluble proportions amounted to 0.50%, by weight.

The stability limit temperature of the untreated pigment was 199° C. according to the previously described test ($\Delta R_x = 1$).

(b) A further 1.5 kg of this pigment charge were mixed for 1 hour at about 30° C. in an intensive mixer (produced by Eirich) with the addition of 0.5%, by weight, of powdered ortho-boric acid and ground, as in (a). A specific surface area of 14.5 m$^2$/g was determined. The analytically-determined boron content, calculated as B$_2$O$_3$, was 0.25%, by weight. The water-soluble proportions amounted to 0.6%, by weight.

The stability limit temperature of the pigment rose to 203° C. ($\Delta R_x - 1$).

(c) A further 1.5 kg of this pigment charge were mixed with 1.0%, by weight, of powdered ortho-boric acid and ground as in (b). A specific surface area of 14 m$^2$/g was determined. The analytically-determined boron content, calculated as B$_2$O$_3$, was 0.55%, by weight. The water-soluble proportions amounted to 0.7%, by weight.

The stability limit temperature of the pigment rose to 213° C. ($\Delta R_x = 1$).

(d) A further 1.5 kg of this pigment charge were mixed with 1.75%, by weight, of powdered ortho-boric acid and ground as in (b) and a specific surface area of 13.8 m$^2$/g was determined. The analytically-determined boron content, calculated as B$_2$O$_3$, was 0.96%, by weight. The water-soluble proportions amounted to 0.9%, by weight.

The stability limit temperature of the pigment rose to 235° C. ($\Delta R_x = 1$).

(e) The last 1.5 kg of the pigment charge were mixed with 2.5%, by weight, of powdered ortho-boric acid and ground as in (b) and a specific surface area of 13.3 m$^2$/g was determined. The analytically-determined boron content, calculated as B$_2$O$_3$, was 1.35%, by weight. The water-soluble proportions amounted to 1.4%, by weight.

The stability limit temperature of the pigment rose to 255° C. ($\Delta R_x = 1$).

EXAMPLE 3

4.5 kg of a black iron oxide coloring pigment produced according to the aniline process (starting charge as for Example 1) were further processed as follows after drying:

(a) 1.5 kg of this charge were mixed for 1 hour at about 30° C. in an intensive mixer (produced by Eirich) with the addition of 0.5%, by weight, of powdered diboron trioxide and then ground for 10 minutes in a hammer mill. A specific surface area of 14.4 m²/g was determined. The analytically-determined boron content, calculated as $B_2O_3$, was 0.40%, by weight. The water-soluble proportions amounted to 0.6%, by weight.

The stability limit temperature of the pigment rose to 204° C. ($\Delta R_x = 1$).

(b) A further 1.5 kg of this charge were mixed with 1.0%, by weight, of powdered diboron trioxide and ground according to (a) and a specific surface area of 14 m²/g was determined. The analytically-determined boron content, calculated as $B_2O_3$, was 0.92%, by weight. The water-soluble proportions amounted to 0.7%, by weight.

The stability limit temperature of the pigment rose to 224° C. ($\Delta R_x = 1$).

(c) The last 1.5 kg of this pigment charge were mixed with 1.5%, by weight, of powdered diboron trioxide and ground according to (a) and a specific surface area of 13.6 m²/g was determined. The analytically-determined boron content, calculated as $B_2O_3$, was 1.40%, by weight. The water-soluble proportions amounted to 1%, by weight.

The stability limit temperature of the pigment rose to 248° C. ($\Delta R_x = 1$).

EXAMPLE 4

12 kg of a black iron oxide coloring pigment (precipitation process) were further processed as follows after drying:

(a) 2 kg of this pigment charge were ground for 10 minutes in a hammer mill and a specific surface area of 18.5 m²/g and an FeO content of 23.0%, by weight, were determined. The nitrogen and boron contents amounted to less than 0.1%, by weight. The water-soluble proportions amounted to 0.4%, by weight.

The stability limit temperature of the untreated pigment was 182° C. according to the previously-described test ($\Delta R_x = 1$).

(b) A further 2 kg of this charge were mixed for 1 hour at about 30° C. with 2.5%, by weight, of 3-amino-1,2,4-triazole in an intensive mixer (produced by Eirich) and then ground for 10 minutes in a hammer mill. A specific surface area of 17.1 m²/g was determined. The analytically-determined content of 3-amino-1,2,4-triazole was 2.1%, by weight. The water-soluble proportions amounted to 1.6%, by weight.

The stability limit temperature of the pigment rose to 203° C. ($\Delta R_x = 1$).

(c) A further 2 kg of this charge were mixed with 5%, by weight, of 3-amino-1,2,4-triazole and ground according to (b) and a specific surface area of 16 m²/g was determined. The analytically-determined content of 3-amino-1,2,4-triazole was 4.4%, by weight. The water-soluble proportions amounted to 3.5%, by weight.

The stability limit temperature of the pigment rose to 221° C. ($\Delta R_x = 1$).

(d) A further 2 kg of this charge were mixed with 2%, by weight, of powdered ortho-boric acid and ground according to (b) and a specific surface area of 17.8 m²/g was determined. The analytically-determined boron content, calculated as $B_2O_3$, was 1.1%, by weight. The water-soluble proportions amounted to 1.2%, by weight.

The stability limit temperature of the pigment rose to 210° C. ($\Delta R_x = 1$).

(e) A further 2 kg of this charge were mixed with 3.5%, by weight, of powdered ortho-boric acid and ground according to (b) and a specific surface area of 17.0 m²/g was determined. The analytically-determined boron content, calculated as $B_2O_3$, was 1.9%, by weight. The water-soluble proportions amounted to 2.1%, by weight.

The stability limit temperature of the pigment rose to 229° C. ($\Delta R_x = 1$).

(f) The last 2 kg of this charge were mixed with 5%, by weight, of powdered ortho-boric acid and ground according to (b) and a specific surface area of 16.4 m²/g was determined. The analytically-determined boron content, calculated as $B_2O_3$, was 2.75%, by weight. The water-soluble proportions amounted to 2.9%, by weight.

The stability limit temperature of the pigment rose to 249° C. ($\Delta R_x = 1$).

EXAMPLE 5

(a) 100 kg of black iron oxide past produced by the aniline process (solids proportion about 55%, by weight) were dried in a Niro spray dried to a residual moisture content of 2%, by weight. The inlet temperature was 475° C. and the outlet temperature was 90° C. The product was then ground for 10 minutes in a Raymond mill and a specific surface area of 16 m²/g and an FeO content of 27.5%, by weight, were determined. The boron content, calculated as $B_2O_3$, was below 0.1%, by weight. The water-soluble proportions amounted to 0.55%, by weight.

The stability limit temperature of the untreated pigment was 195° C. according to the previously-described test ($\Delta R_x = 1$).

(b) A further 100 kg of this black iron oxide paste (solids proportion about 55%, by weight) were mixed for 1 hour in a Nauta mixer at room temperature with 1.5%, by weight, (based on $Fe_3O_4$), of powdered ortho-boric acid, spray-dried and ground according to (a). A specific surface area of 15.5 m²/g was determined. The boron content, calculated as $B_2O_3$, was 0.80%, by weight. The water-soluble proportions amounted to 1.0%, by weight.

The stability limit temperature of the pigment rose to 223° C. ($\Delta R_x = 1$).

(c) A further 100 kg of this black iron oxide paste (solids proportion about 55%, by weight) were mixed with 3%, by weight, (based on $Fe_3O_4$), of powdered ortho-boric acid spray-dried and ground as in (b). A specific surface area of 14.8 m²/g was determined. The boron content, calculated as $B_2O_3$, was 1.60%, by weight. The water-soluble proportions amounted to 1.5%, by weight.

The stability limit temperature of the pigment rose to 251° C. ($\Delta R_x = 1$).

EXAMPLE 6

7.5 kg of an acicular magnetite pigment produced in a conventional manner (according to EP 3100) for magnetic signal recordings were processed as follows.

(a) 1.5 kg of this charge were brought to a grain size of about 1 mm, and a specific surface area of 24 m²/g and an FeO content of 21.5%, by weight, were determined. The analytically-determined boron content, calculated as $B_2O_3$, was below 0.05%, by weight. The water-soluble proportions amounted to 0.1%, by weight.

The stability limit temperature of the untreated pigment was 148° C. according to the above-described test ($\Delta R_x = 1$).

(b) A further 1.5 kg of this charge were mixed for 1 hour at about 30° C. with 1%, by weight, of powdered ortho-boric acid in an intensive mixer (produced by Eirich) and then brought to a grain size of 1 mm as in (a). A specific surface area of 23.4 m²/g was determined. The analytically-determined boron content, calculated as $B_2O_3$, was 0.52%, by weight. The water-soluble proportions amounted to 0.5%, by weight.

The stability limit temperature of the pigment rose to 158° C. ($\Delta R_x = 1$).

(c) A further 1.5 kg of this charge were mixed with 1.5%, by weight, of powdered orthoboric acid, and then brought to a grain size of about 1 mm as in (b). A specific surface area of 23 m²/g was determined. The analytically-determined boron content, calculated as $B_2O_3$, was 0.80%, by weight. The water-soluble proportions amounted to 0.4%, by weight.

The stability temperature of the pigment rose to 173° C. ($\Delta R_x = 1$).

(d) A further 1.5 kg of this charge were mixed with 2.0%, by weight, of powdered orthoboric acid and brought to a grain size of about 1 mm as in (b). A specific surface area of 22.7 m²/g was determined. The analytically-determined boron content, calculated as $B_2O_3$, was 1.1%, by weight. The water-soluble proportions amounted to 0.7% by weight.

The stability limit temperature of the pigment rose to 199° C. ($\Delta R_x = 1$).

(e) The last 1.5 kg of this charge were mixed with 3%, by weight, of powdered orthoboric acid and brought to a grain size of about 1 mm as in (b). A specific surface area of 22 m²/g was determined. The analytically-determined boron content, calculated as $B_2O_3$, was 1.65%, by weight. The water-soluble proportions amounted to 1.1%, by weight.

The stability limit temperature of the pigment rose to 224° C. ($\Delta R_x = 1$).

EXAMPLE 7

6 kg of the magnetite pigment used in Example 6 were further processed as follows:

(a) 1.5 kg of this charge were mixed for 1 hour at about 30° C. with 0.5%, by weight, of powdered diborontrioxide in an intensive mixer (produced by Eirich) and then brought to a grain size of about 1 mm. A specific surface area of 23.7 m²/g was determined. The analytically-determined boron content, calculated as $B_2O_3$, was 0.45%, by weight. The water-soluble proportions amounted to 0.2%, by weight.

The stability limit temperature of the pigment rose to 156° C. ($\Delta R_x = 1$).

(b) A further 1.5 kg of this charge were mixed with 1%, by weight, of powdered diboron trioxide and brought to a grain size of 1 mm as in (a). A specific surface area of 23.3 m²/g was determined. The analytically-determined boron content, calculated as $B_2O_3$, was 0.96%, by weight. The water-soluble proportions amounted to 0.7%, by weight.

The stability limit temperature of the pigment rose to 168° C. ($\Delta R_x = 1$).

(c) A further 1.5 kg of this charge were mixed with 1.5%, by weight, of powdered diboron trioxide and brought to a grain size of about 1 mm as described in (a). A specific surface area of 23.1 m²/g was determined. The analytically-determined boron content, calculated as $B_2O_3$, was 1.42%, by weight. The water-soluble proportions amounted to 1.0%, by weight.

The stability limit temperature of the pigment rose to 195° C. ($\Delta R_x = 1$).

(d) The last 1.5 kg were mixed with 2.5%, by weight, of powdered diboron trioxide and brought to a grain size of about 1 mm according to (a). A specific surface area of 22.4 m²/g was determined. The analytically-determined boron content, calculated as $B_2O_3$, was 2.40%, by weight. The water-soluble proportions amounted to 1.4%, by weight.

The stability limit temperature of the pigment rose to 235° C. ($\Delta R_x = 1$).

TABLE I

| Example | | Addition | Quantity [%, by weight] | Stability limit temperature [°C.] | Water-soluble proportions [%, by weight] | BET surface area [m²/g] |
|---|---|---|---|---|---|---|
| 1 | a | None | | 198 | 0.55 | 14.8 |
| | b | 3-amino-1,2,4-triazole | 0.8 | 208 | 1.0 | 14.1 |
| | c | 3-amino-1,2,4-triazole | 1.55 | 213 | 1.4 | 13.5 |
| | d | 3-amino-1,2,4-triazole | 1.9 | 217 | 1.7 | 13.4 |
| | e | 3-amino-1,2,4-triazole | 3.4 | 225 | 2.8 | 12.6 |
| 2 | b | $H_3BO_3$ | 0.5 | 203 | 0.6 | 14.5 |
| | c | " | 1.0 | 213 | 0.7 | 14 |
| | d | " | 1.75 | 235 | 0.9 | 13.8 |
| | e | " | 2.5 | 255 | 1.4 | 13.3 |
| 3 | a | $B_2O_3$ | 0.5 | 204 | 0.6 | 14.4 |
| | b | " | 1.0 | 224 | 0.7 | 14 |
| | c | " | 1.5 | 248 | 1.0 | 13.6 |
| 4 | a | None | | 182 | 0.4 | 18.5 |
| | b | 3-amino-1,2,4-triazole | 2.1 | 203 | 1.6 | 17.1 |
| | c | 3-amino-1,2,4-triazole | 4.4 | 221 | 3.5 | 16 |
| | d | $H_3BO_3$ | 2.0 | 210 | 1.2 | 17.8 |
| | e | " | 3.5 | 229 | 2.1 | 17 |
| | f | " | 5.0 | 249 | 2.9 | 16.4 |
| 5 | a | none | | 195 | 0.55 | 16 |
| | b | $H_3BO_3$ | 1.5 | 223 | 1.0 | 15.5 |
| | c | " | 3.0 | 251 | 1.5 | 14.8 |
| 6 | a | none | | 148 | 0.1 | 24 |
| | b | $H_3BO_3$ | 1.0 | 158 | 0.5 | 23.4 |
| | c | " | 1.5 | 173 | 0.4 | 23 |
| | d | " | 2.0 | 199 | 0.7 | 22.7 |
| | e | " | 3.0 | 224 | 1.1 | 22 |
| 7 | a | $B_2O_3$ | 0.5 | 156 | 0.2 | 23.7 |
| | b | " | 1.0 | 168 | 0.7 | 23.3 |
| | c | " | 1.5 | 195 | 1.0 | 23.1 |

TABLE I-continued

| Example | Addition | Quantity [%, by weight] | Stability limit temperature [°C.] | Water-soluble proportions [%, by weight] | BET surface area [m²/g] |
|---|---|---|---|---|---|
| d | " | 2.5 | 235 | 1.4 | 22.4 |

Note: Example 1a is the control for examples 1, 2 and 3.
Note: Example 6a is the control for Examples 6 and 7.

What is claimed is:

1. Stabilized iron oxide particles having an iron(II) content of at least 5%, by weight, calculated as FeO, and coated with from 0.1 to 4% by weight of boron in the form of boron-oxygen compounds and calculated as $B_2O_3$.

2. Stabilized iron oxide particles according to claim 1 wherein the coating comprises from 0.5 to 2% by weight of boron in the form of boron-oxygen compounds and calculated as $B_2O_3$.

3. Stabilized iron oxide pigment particles according to claim 1 or claim 2 containing black iron oxide, brown iron oxide or mixtures thereof as coloring pigments.

4. Stabilized iron oxide particles according to claim 1 or claim 2 containing magnetite or mixed phases of magnetite with maghemite and or ferrites.

5. Stabilized iron oxide particles according to claim 1 or claim 2 containing magnetite or iron oxides having an oxidation state between magnetite and maghemite coated with at least one magnetic metal oxide.

6. Magnetic recording media comprising stabilized magnetic iron oxide particles according to claim 4 or claim 5 uniformly suspended in a carrier material.

7. A process for the production of the iron oxide particles according to claim 1 comprising mixing an iron oxide with at least one boron compound to thereby coat said oxide with the boron compound.

8. A process for the production of iron oxide particles according to claim 1 comprising contacting an iron oxide in suspension with at least one boron compound to coat said oxide with the boron compound and drying the coated oxide.

9. A process according to claim 7 or 8 wherein the boron compound comprises boron oxides, boric acids, salts of boric acids or mixtures thereof.

* * * * *